(12) United States Patent
Heverly, II

(10) Patent No.: US 10,899,437 B2
(45) Date of Patent: Jan. 26, 2021

(54) PLANAR VIBRATION ISOLATOR

(71) Applicant: Bell Helicopter Textron Inc., Fort Worth, TX (US)

(72) Inventor: David E. Heverly, II, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 372 days.

(21) Appl. No.: 15/960,931

(22) Filed: Apr. 24, 2018

(65) Prior Publication Data

US 2019/0322361 A1 Oct. 24, 2019

(51) Int. Cl.
*B64C 27/00* (2006.01)
*F16F 7/10* (2006.01)
*F16F 7/104* (2006.01)
*F16F 15/16* (2006.01)

(52) U.S. Cl.
CPC ............ *B64C 27/001* (2013.01); *F16F 7/104* (2013.01); *F16F 7/1034* (2013.01); *F16F 15/161* (2013.01); *B64C 2027/002* (2013.01); *B64C 2027/003* (2013.01); *F16F 2222/12* (2013.01); *F16F 2232/02* (2013.01)

(58) Field of Classification Search
CPC ............ B64C 27/001; B64C 2027/002; B64C 2027/003; B64C 2027/004; B64C 2027/005; F16F 7/104; F16F 7/1034
See application file for complete search history.

(56) References Cited

U.S. PATENT DOCUMENTS

| | | | | |
|---|---|---|---|---|
| 3,917,246 A * | 11/1975 | Gartner | ................ | F16F 7/1017 267/136 |
| 2003/0173725 A1* | 9/2003 | Noe | ................ | F16F 15/31 267/140.14 |
| 2015/0232174 A1* | 8/2015 | Jolly | ................ | F16F 15/1485 74/574.2 |

* cited by examiner

*Primary Examiner* — Richard G Davis
(74) *Attorney, Agent, or Firm* — Daniel J. Chalker; Edwin S. Flores; Chalker Flores, LLP

(57) ABSTRACT

A method and system to isolate vibrations, including a first pair of fluid chambers disposed to isolate first vibrations between a first body and a second body, wherein the first vibrations are parallel to a first axis, wherein the first body is a propeller hub, a rotor hub, a pylon attachment, or an engine, and wherein the second body is a propeller shaft, a rotor mast, or a body attachment; a second pair of fluid chambers disposed to isolate second vibrations between the first and second bodies, wherein the second vibrations are parallel to a second axis perpendicular to the first axis; first and second inertia tracks disposed to place the first and second pairs of chambers in fluid communication, respectively; and a plurality of elastic energy storage devices coupled to the first body and the second body and disposed to isolate vibrations between the first and second bodies.

31 Claims, 15 Drawing Sheets

PLANAR VIBRATION ISOLATOR

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of rotorcraft, in particular, the field of isolating vibrations from rotor systems.

BACKGROUND OF THE INVENTION

Without limiting the scope of the invention, its background is described in connection with rotorcraft.

One example of an aircraft is a rotorcraft. Rotorcraft includes helicopters and tiltrotors. Rotorcraft vibration greatly affects the mission performance of a rotorcraft and operating costs due to its effects in limiting the life of critical components and in fatiguing crew and passengers. By effectively isolating vibration transfer from the rotor to the fuselage, the life of critical components can be lengthened, lowering operating costs, and ride quality can be improved. Prior art methods of isolating such vibrations include the use of pendulum absorbers, which often have considerable weight while being only partly effective. Methods and apparatuses for isolating vibrations caused by rotor systems which are relatively light in weight and more effective than typical prior art methods and apparatuses are desirable.

SUMMARY OF THE INVENTION

In some embodiments of the disclosure, a vibration isolation system is disclosed as including a first pair of fluid chambers disposed to isolate first vibrations between a first body and a second body, wherein the first pair of fluid chambers is coupled to first body and the second body, wherein the first vibrations are substantially parallel to a first axis, wherein the first body is a propeller hub, a rotor hub, a pylon attachment, or an engine, wherein the second body is a propeller shaft, a rotor mast, or a body attachment; and wherein the body attachment may be a fuselage attachment or a nacelle attachment; a second pair of fluid chambers disposed to isolate second vibrations between the first body and the second body, wherein the second pair of fluid chambers is coupled to first body and the second body, and wherein the second vibrations are substantially parallel to a second axis that is substantially perpendicular to the first axis; a first inertia track disposed to place the first pair of fluid chambers in fluid communication; a second inertia track disposed to place the second pair of fluid chambers in fluid communication; a plurality of elastic energy storage devices coupled to the first body and the second body and disposed to isolate vibrations between the first body and the second body. In one aspect, the plurality of elastic energy storage devices includes springs. In another aspect, adjacent fluid chambers are separated by a plurality of compartments, each compartment enclosing an elastic energy storage device. In another aspect, adjacent fluid chambers are separated by a plurality of compartments, each compartment enclosing an elastic energy storage device. In another aspect, each of the fluid chambers of the first and second pairs of fluid chambers is filled with a non-compressible fluid, a non-viscous fluid, a non-freezable fluid, a fluid with a high density or specific gravity, a hydraulic fluid, oil, or some other fluid. In another aspect, the first pair of fluid chambers is disposed on opposite sides of the first body and the second pair of fluid chambers is disposed on opposite sides of the first body. In another aspect, the system isolates vibrations in a helicopter, a tiltrotor craft, or an airplane.

In some embodiments of the disclosure, a vibration isolation system is disclosed as including a plurality of fluid chambers filled with a fluid and disposed to isolate vibrations between a first body and a second body, wherein the plurality of fluid chambers is coupled to first body and the second body, wherein the vibrations occur in or parallel to a plane, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment; a plurality of inertia tracks, each inertia track disposed to place to one fluid chamber of the plurality of fluid chambers in fluid communication with another of the fluid chambers of the plurality of fluid chambers; and a plurality of elastic energy storage devices coupled to the first body and the second body and disposed to isolate the vibrations between the first body and the second body.

In some embodiments of the disclosure, a method of isolating vibration in an aircraft is disclosed as including disposing a first pair of fluid chambers to isolate first vibrations between a first body and a second body, wherein the first pair of fluid chambers is coupled to first body and the second body, wherein the first vibrations are substantially parallel to a first axis, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment; disposing a second pair of fluid chambers to isolate second vibrations between the first body and the second body, wherein the second pair of fluid chambers is coupled to first body and the second body, wherein the second vibrations are substantially parallel to a second axis that is substantially perpendicular to the first axis; disposing a first inertia track to place the first pair of fluid chambers in fluid communication; disposing a second inertia track to place the second pair of fluid chambers in fluid communication; disposing a plurality of elastic energy storage devices to isolate the first vibrations or the second vibrations to the first body or to the second body; filling each fluid chamber with fluid; and isolating vibrations between the first body and the second body using the fluid in the first pair of fluid chambers, the second pair of fluid chambers, the first inertia track, the second inertia track, and the elastic energy storage devices. In one aspect, the plurality of elastic energy storage devices includes springs. In another aspect, adjacent fluid chambers are separated by a plurality of compartments, each compartment enclosing an elastic energy storage device. In another aspect, each of the fluid chambers of the first and second pairs of fluid chambers is filled with a non-compressible fluid, a non-viscous fluid, a non-freezable fluid, a fluid with a high density or specific gravity, a hydraulic fluid, oil, or some other fluid. In another aspect, the first pair of fluid chambers is disposed on opposite sides of the first body and the second pair of fluid chambers is disposed on opposite sides of the first body. In another aspect, the method isolates vibrations in a helicopter, a tiltrotor craft, or an airplane.

In some embodiments of the disclosure, a method is disclosed as including disposing a plurality of fluid chambers disposed to isolate vibrations between a first body and a second body, wherein the plurality of fluid chambers is coupled to first body and the second body, wherein the vibrations are in or parallel to a plane, wherein the first body is a propeller hub, a rotor hub, a pylon attachment, or an engine, and wherein the second body is a propeller shaft, a rotor mast, or a body attachment, and wherein the body attachment may be a fuselage attachment or a nacelle attachment; disposing a plurality of inertia tracks, each inertia track disposed to place to one fluid chamber of the plurality of fluid chambers in fluid communication with another of the fluid chambers of the plurality of fluid chambers; disposing a plurality of elastic energy storage devices disposed to isolate the vibrations between the first body and the second body; filling each fluid chamber with a fluid; and isolating the vibrations between the first body and the second body using the fluid in the plurality of fluid chambers, the plurality of inertia tracks, and the elastic energy storage devices.

In some embodiments of the disclosure, a rotorcraft is disclosed as including a fuselage; one or more engines coupled to the fuselage; and a vibration isolation system coupled to the one or more engines including a first pair of fluid chambers, filled with a fluid and disposed to isolate first vibrations between a first body and a second body, wherein the first vibrations are substantially parallel to a first axis, wherein the first body is a propeller shaft, a rotor mast, a pylon attachment, or an engine, wherein the second body is a propeller hub, a rotor hub, or a body attachment, wherein the body attachment may be a fuselage attachment or a nacelle attachment, and wherein the first pair of fluid chambers is coupled to first body and the second body; a second pair of fluid chambers, filled with the fluid, and disposed to isolate second vibrations between the first body and the second body, wherein the second vibrations are substantially parallel to a second axis that is substantially perpendicular to the first axis, and wherein the second pair of fluid chambers is coupled to first body and the second body; a first inertia track disposed to place the first pair of fluid chambers in fluid communication; a second inertia track disposed to place the second pair of fluid chambers in fluid communication; and a plurality of elastic energy storage devices coupled to first body and the second body and disposed to isolate the first vibrations or the second vibrations between the first body and the second body.

In some embodiments of the disclosure, a rotorcraft is disclosed as including a fuselage; one or more engines coupled to the fuselage; and a vibration isolation system coupled to the one or more engines including a plurality of fluid chambers filled with a fluid, and disposed to isolate vibrations between a first body and a second body, wherein the vibrations occur in or parallel to a plane, wherein the first body is a propeller shaft, a rotor mast, a pylon attachment, or an engine, wherein the second body is a propeller hub, a rotor hub, or a body attachment, and wherein the plurality of fluid chambers is coupled to the first body and the second body; a plurality of inertia tracks, each inertia track disposed to place to one fluid chamber of the plurality of fluid chambers in fluid communication with another of the fluid chambers of the plurality of fluid chambers; and a plurality of elastic energy storage devices coupled to the first body and the second body and disposed to isolate the vibrations between the first body and the second body.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
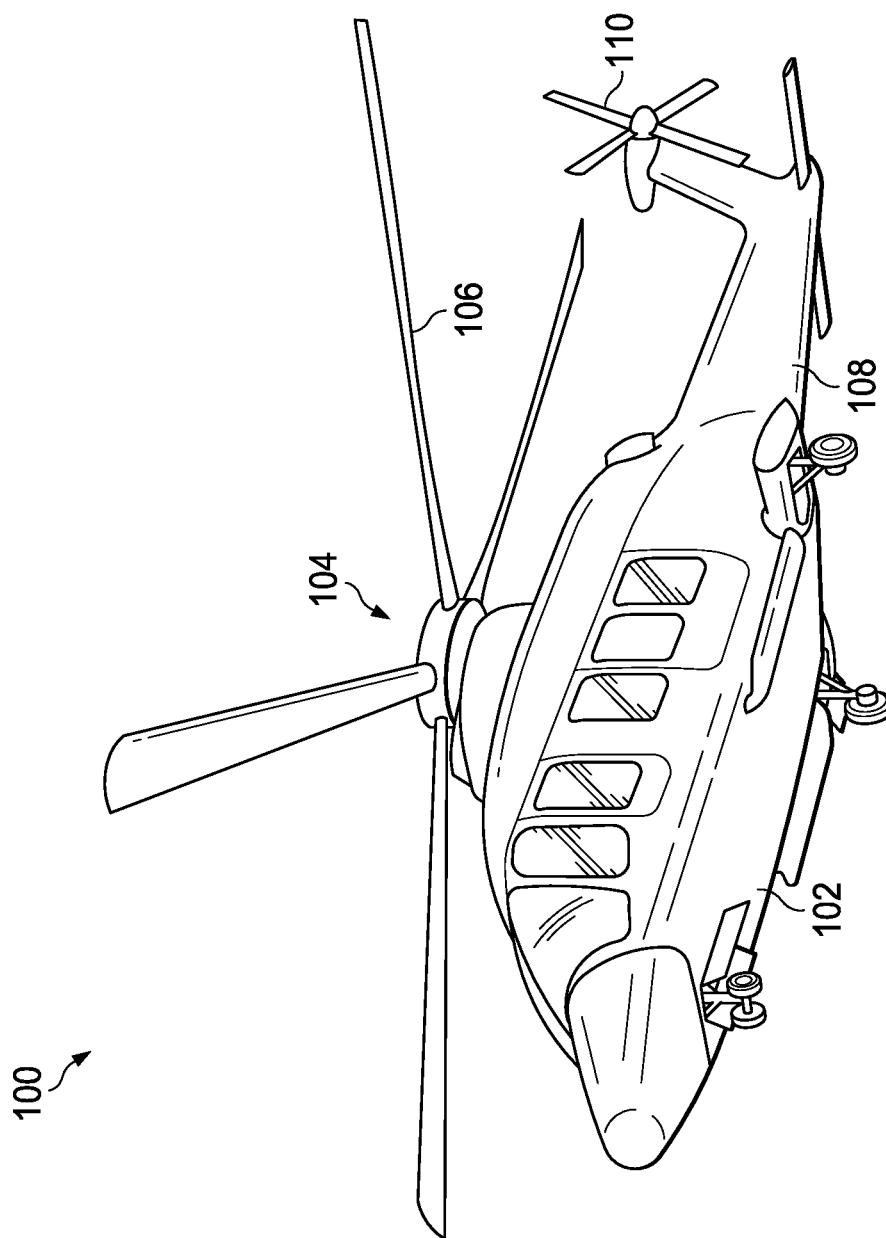
FIG. 1 shows a side view of a helicopter according to a particular embodiment of the present application.

FIG. 1 shows an aircraft 100 in accordance with an embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
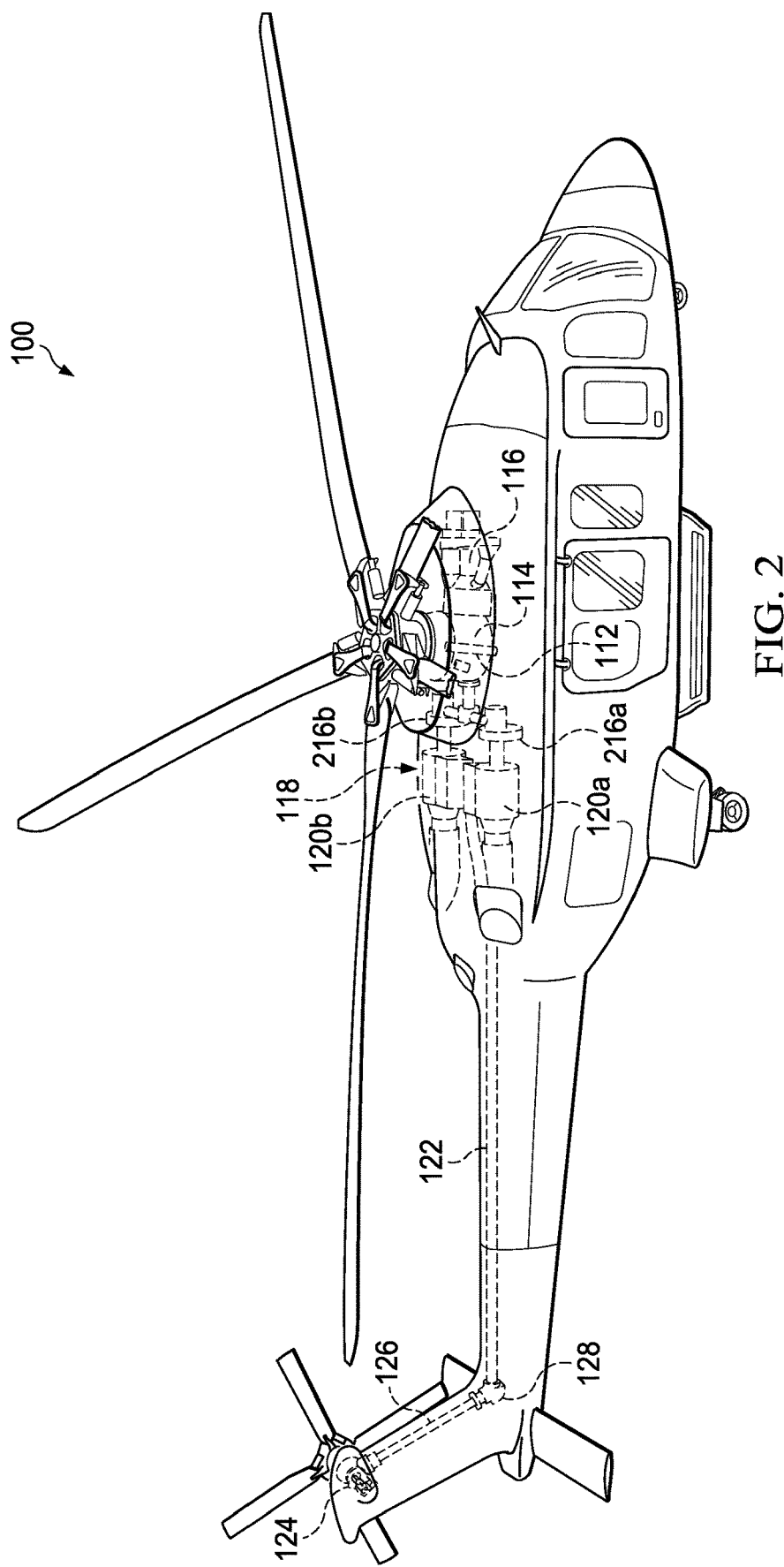
FIG. 2 shows a partial cross-section, perspective view of a helicopter according to an embodiment of the present application.

For example, FIG. 2 shows a partial cross-section perspective view of aircraft 100 that includes additional detail of the present invention. Aircraft 100 further includes a main rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

Figure 3A:
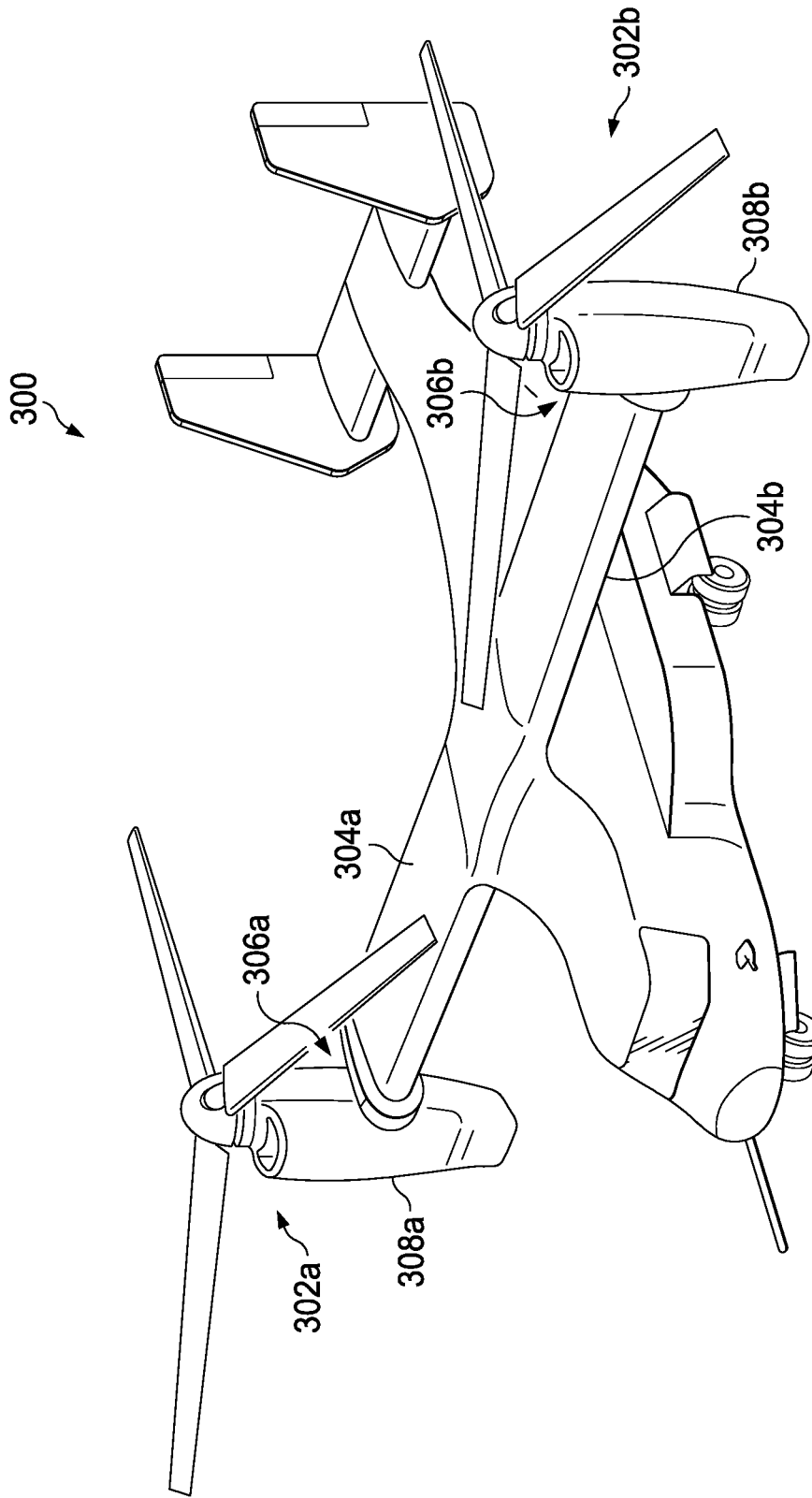
FIGS. 3A and 3B show perspective views of tiltrotor aircraft in which embodiments of the present invention may be used.
Figure 3B:
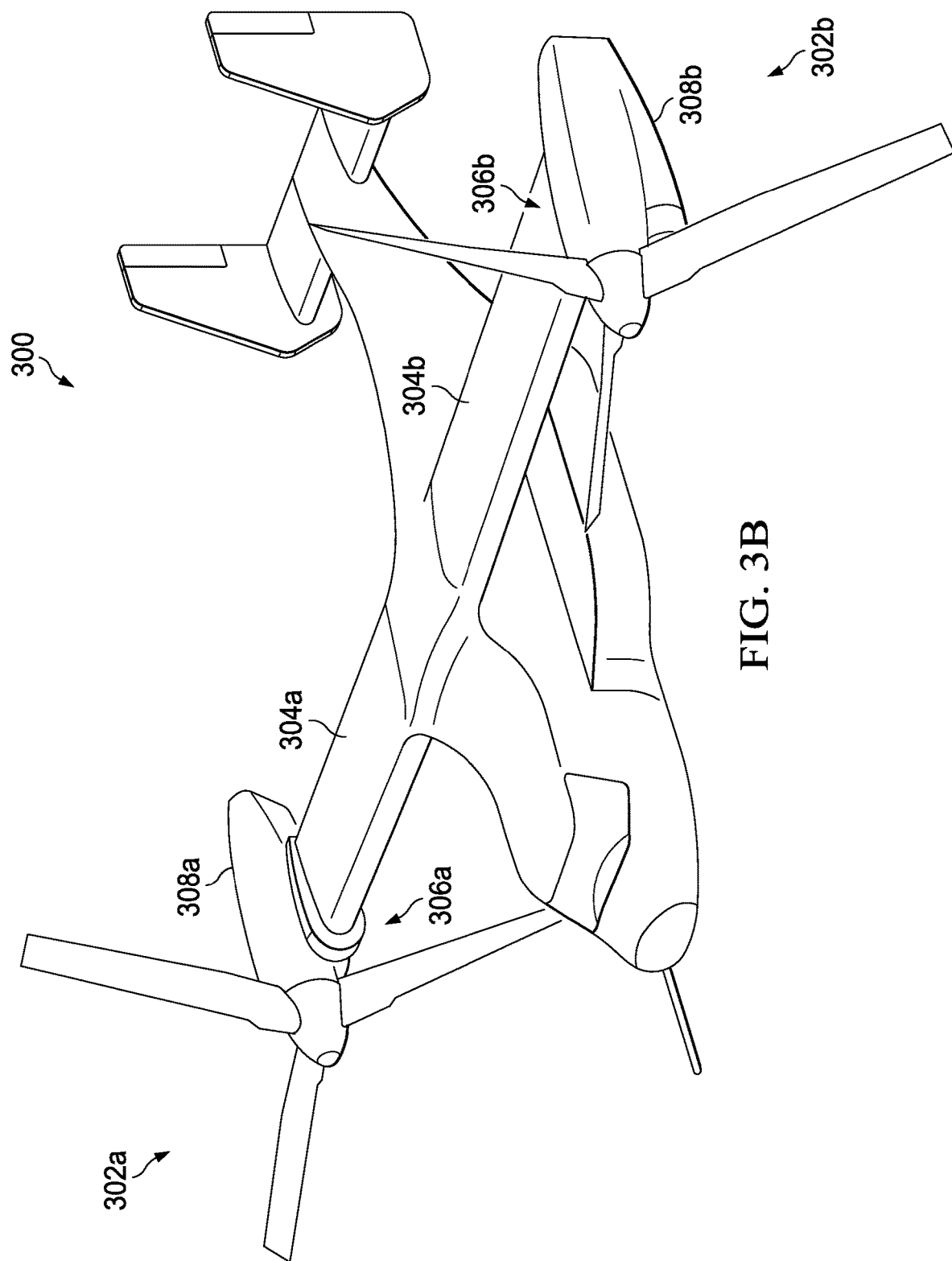

FIGS. 3A and 3B show a tiltrotor aircraft 300 that utilizes the system and methods in accordance with the present invention. FIG. 3A illustrates the tiltrotor aircraft 300 in takeoff-and-landing mode or hover mode, and FIG. 3B depicts the tiltrotor aircraft 300 in cruise mode. Tiltrotor aircraft 300 includes tiltrotor assemblies 302a and 302b that are carried by wings 304a and 304b, and are disposed at end portions 306a and 306b of wings 304a and 304b, respectively. Tiltrotor assemblies 302a and 302b include nacelles 308a and 308b, which carry the engines and transmissions of tiltrotor aircraft 300. Tiltrotor assemblies 302a and 302b move or rotate relative to wings 304a and 304b between a helicopter or hover mode in which tiltrotor assemblies 302a and 302b are tilted upward, such that tiltrotor aircraft 300 flies like a conventional helicopter; and an airplane or cruise mode in which tiltrotor assemblies 302a and 302b are tilted forward, such that tiltrotor aircraft 300 flies like a conventional propeller driven aircraft.

The present invention is a vibration isolator that utilizes the Liquid Inertia Vibration Eliminator (LIVE) principles and is constructed to provide vibration isolation of oscillatory motions in a plane. This invention provides a structural connection between two bodies and reduces the transfer of oscillatory motions from the first body to the second body. This invention is effective at isolating main rotor hub oscillatory forces from being transferred to the main rotor mast. This invention is also effective at isolating the vibrations of a rotor pylon/gear box assembly from the airframe/fuselage.

Embodiments of the present invention may be applied to isolate vibrations in at least mast-rotor hub interfaces and pylon-fuselage interfaces. When the present invention is incorporated at the main rotor hub, vibrations resulting from the oscillatory shear forces in the plane of the rotor are effectively isolated. FIGS. 4A, 4B, 4C, and 4D show embodiments of the present invention incorporated at the main rotor hub of a helicopter, with the mast in various positions within the rotor hub. One skilled in the art will recognize that similar embodiments may be used to isolate vibration in the plane of a rotor in a tiltrotor craft. In the embodiment shown, there are exemplary, non-limiting numbers of components: four fluid chambers, four elastic energy storage devices, and two fluid inertia tracks. One skilled in the art will recognize that there may be a variety numbers of fluid chambers, inertia tracks, and elastic energy storage devices in embodiments of the present invention, such as 2, 3, 4, 5, 6, 7, 8, or more fluid chambers; 1, 2, 3, 4, 5, 6, 7, 8, or more inertia tracks; and 2, 3, 4, 5, 6, 7, 8, or more elastic energy storage devices.

Embodiments of the present invention may be placed between any two portions of a rotorcraft to prevent the transmission of vibrations (oscillatory loads) from one part to the other. On a helicopter, it could be placed, for example, between the rotor and the mast, at the pylon-fuselage interface, or between the engine and the fuselage. On a tiltrotor, it could be placed, for example, between the rotor and the mast, between the mast support structure and the nacelle structure, between the engine and the nacelle, between the nacelle and the wing, or between the wing and the fuselage. It is preferred to have the device close to the primary source of vibration (i.e., the rotor). Generally, embodiments of the present invention may be used to from a first body, which may be a propeller hub, a rotor hub, a pylon attachment, or an engine, and a second body, which may be a propeller shaft, a rotor mast, or a body attachment (and body attachment may include a fuselage attachment, which includes the attachment of a wing to a fuselage and the attachment of a pylon to a fuselage, or a nacelle attachment, which includes an attachment of a nacelle to a wing).

Figure 4A:
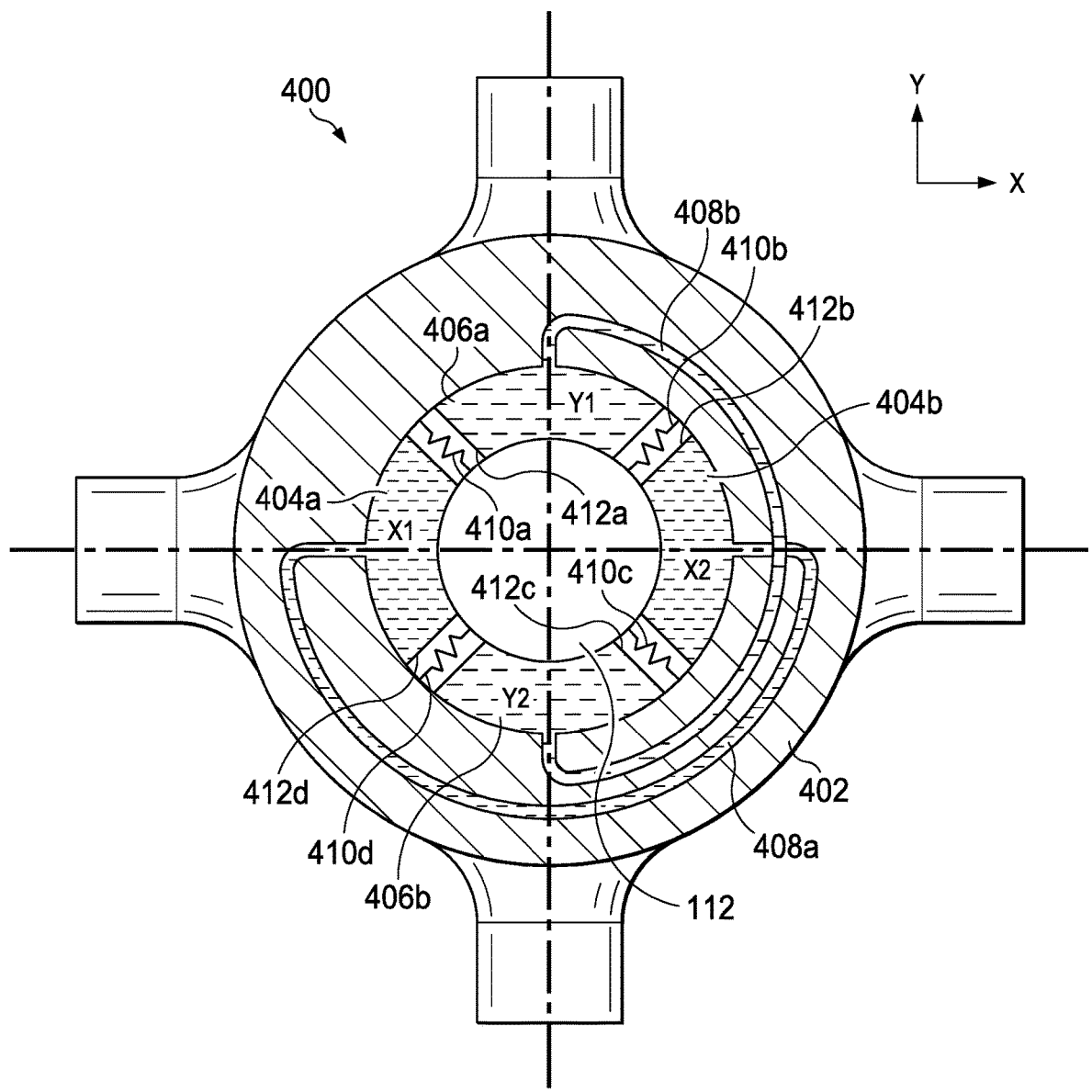
FIGS. 4A, 4B, 4C and 4D illustrate various embodiments of the present invention applied to a mast and rotor hub.

FIG. 4A depicts a vibration isolation system 400 according to an embodiment the present invention. The main rotor mast 112 (also referred to as mast 112 herein) is in a neutral position, centrally located within the rotor hub 402. Here, the rotor hub 402 is a non-limiting exemplary component. This embodiment and the present invention generally may be used with a first body that is, for example, propeller hub, a rotor hub, a pylon attachment, or an engine. Further, the mast 112 is a non-limiting exemplary component. This embodiment and the present invention generally may be used with a second body that is, for example, a propeller shaft, a rotor mast, or a body attachment (and body attachment may include a fuselage attachment or a nacelle attachment). With the mast 112 in this neutral position, X-axis fluid chambers X1 404a and X2 404b are disposed on opposite sides of the mast 112, are coupled directly or indirectly to the mast 112 and the rotor hub 402, are of equal size, and are filled with equal amounts of fluid, such as a non-compressible fluid, a non-viscous fluid, a non-freezable fluid, a fluid with a high density or specific gravity, a hydraulic fluid, oil, or some other fluid, and preferably a non-compressible, non-viscous fluid with a very low freezing temperature and high density or specific gravity. Y-axis fluid chambers Y1 406a and Y2 406b are also disposed on opposite sides of the mast 112, are coupled directly or indirectly to the mast 112 and the rotor hub 402, are of equal size, and are filled with equal amounts of fluid. The X-axis fluid chambers 404a, 404b are in fluid communication through the X-axis inertia track 408a. Likewise, the Y-axis fluid chambers 406a, 406b are in fluid communication through the Y-axis inertia track 408b. In this figure, no fluid has been required to flow from one of the X-axis fluid chambers 404a, 404b to the other, or from one of the Y-axis fluid chambers 406a, 406b to the other. The mast 112 and the rotor hub 402 are also coupled by elastic energy storage devices, each one in a compartment that partitions two adjacent chambers from each other. In FIGS. 4A, 4B, 4C, and 4D, these elastic energy storage devices are represented by non-limiting exemplary springs 410a, 410b, 410c, 410d within compartments 412a, 412b, 412c, 412d, respectively, and each compartment 412a, 412b, 412c, 412d is disposed between adjacent fluid chambers. One skilled in the art will recognize that these elastic energy storage devices may be springs such as metallic coil springs, non-metallic coil springs, leaf springs, torsion springs, elastomeric springs, or other devices besides springs, such as enclosed volumes of gas, e.g. air. These elastic energy storage devices stabilize the mast 112 within the rotor hub 402 and are disposed to further isolate vibrations and to return the mast 112 to a neutral position within the rotor hub 402 when displaced from a neutral position. It is the correct combination of the elastic energy storage devices, fluid compartments, and inertia tracks that results in isolation (non-transfer) of oscillatory (non-steady) loads from the rotor system to the mast.

Figure 4B:
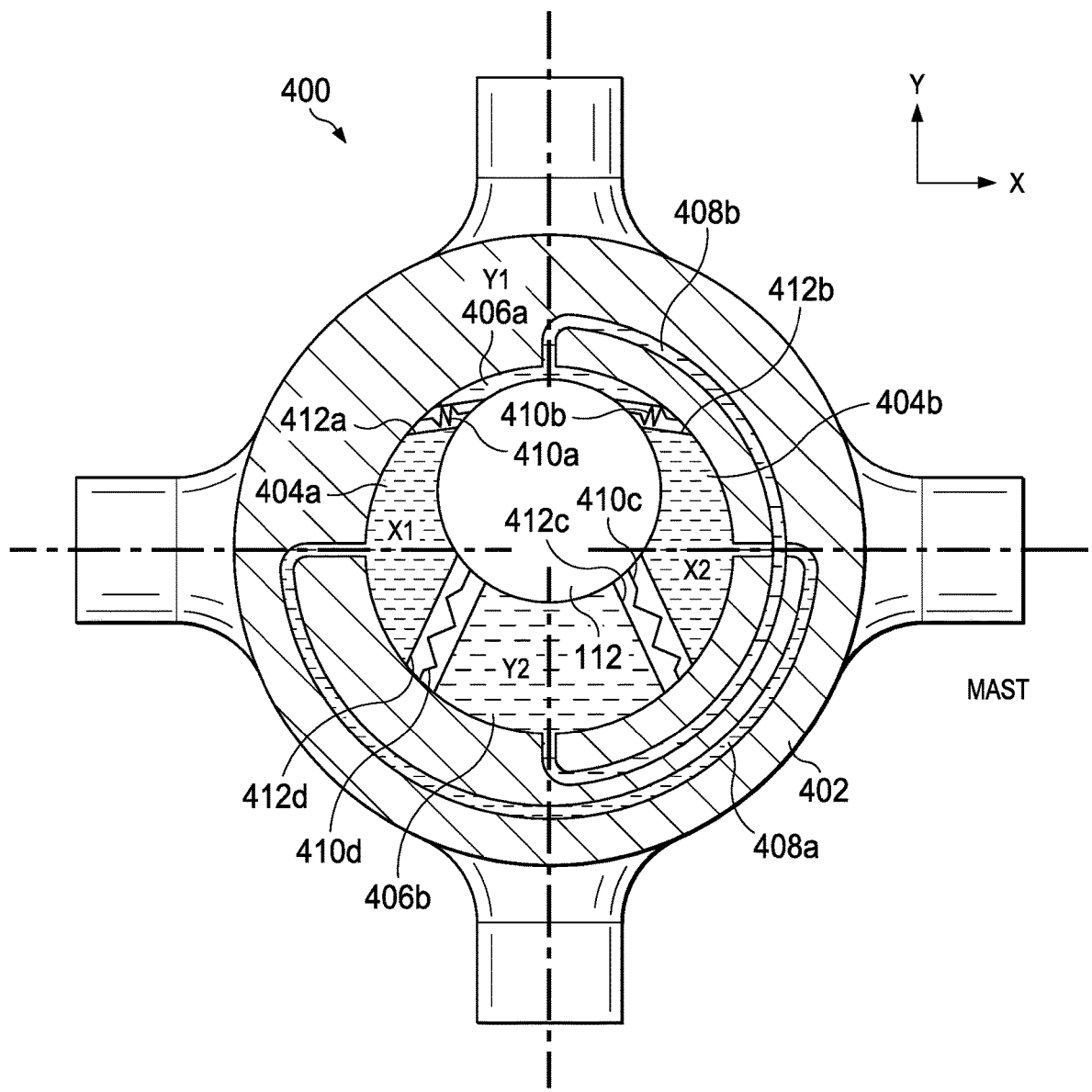

FIG. 4B illustrates the vibration isolation system 400, where the mast 112 has moved along the Y-axis within the rotor hub 402. While fluid has not moved from one X-axis fluid chamber 404a, 404b to the other, Y-axis fluid chamber Y1 406a is smaller as a result of the motion of the mast 112, and Y-axis fluid chamber Y2 406b is larger. The embodiment maintains fluid around the mast 112 by channeling fluid from Y-axis fluid chamber Y1 406a to the y-axis fluid chamber Y2 406b through inertia track 408b. FIG. 4B also shows springs 410a, 410b, 410c, 410d within compartments 412a, 412b, 412c, 412d, respectively.

Figure 4C:
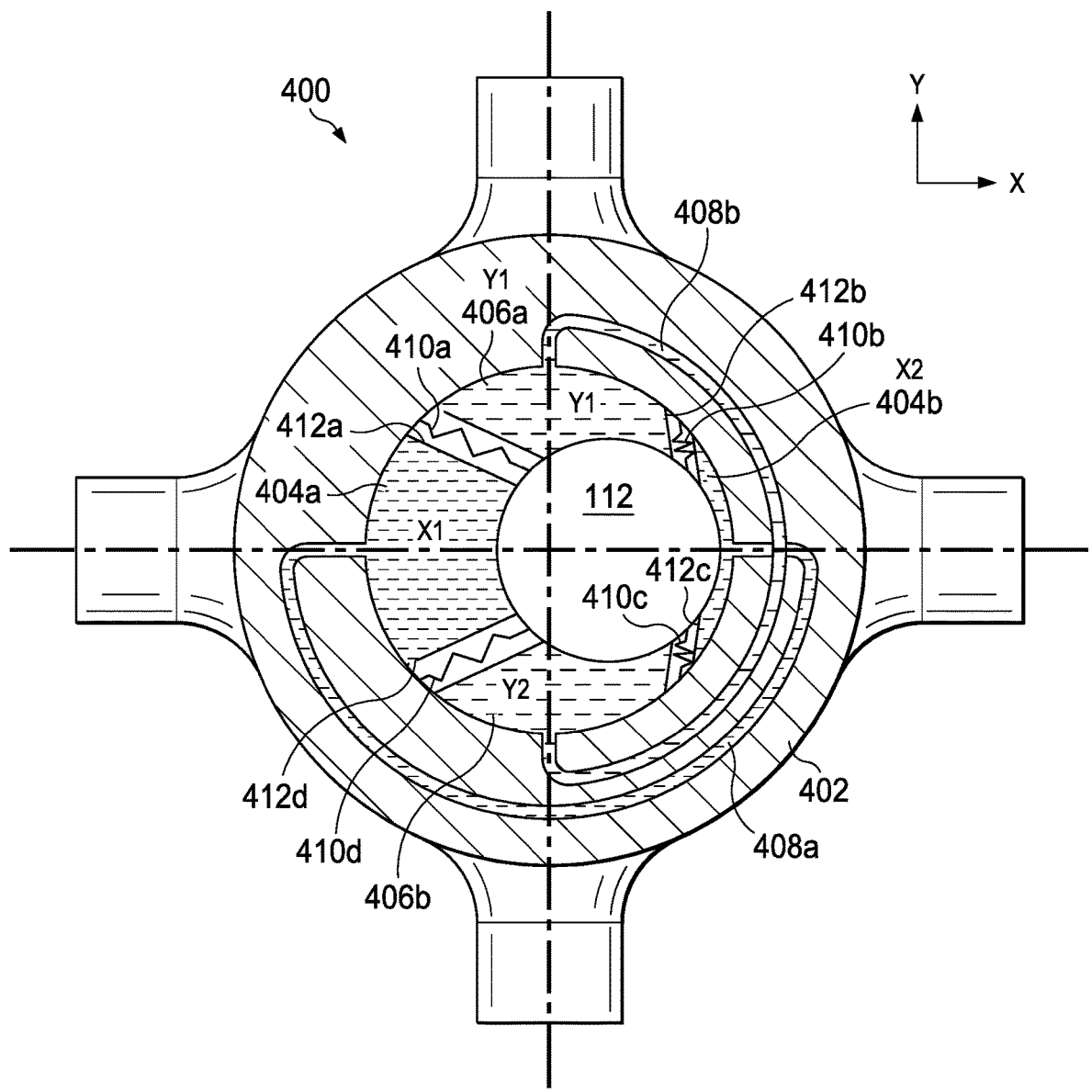

FIG. 4C illustrates the vibration isolation system 400, where the mast 112 has moved along the X-axis within the rotor hub 402. While fluid has not moved from one Y-axis fluid chamber 406a, 406b to the other, X-axis fluid chamber X1 404b is smaller as a result of the motion of the mast 112, and X-axis fluid chamber X2 404a is larger. The embodiment maintains fluid around the mast 112 by channeling fluid from X-axis fluid chamber X1 404b to X-axis fluid chamber X2 404a through inertia track 408a. FIG. 4C also shows springs 410a, 410b, 410c, 410d within compartments 412a, 412b, 412c, 412d, respectively.

Figure 4D:
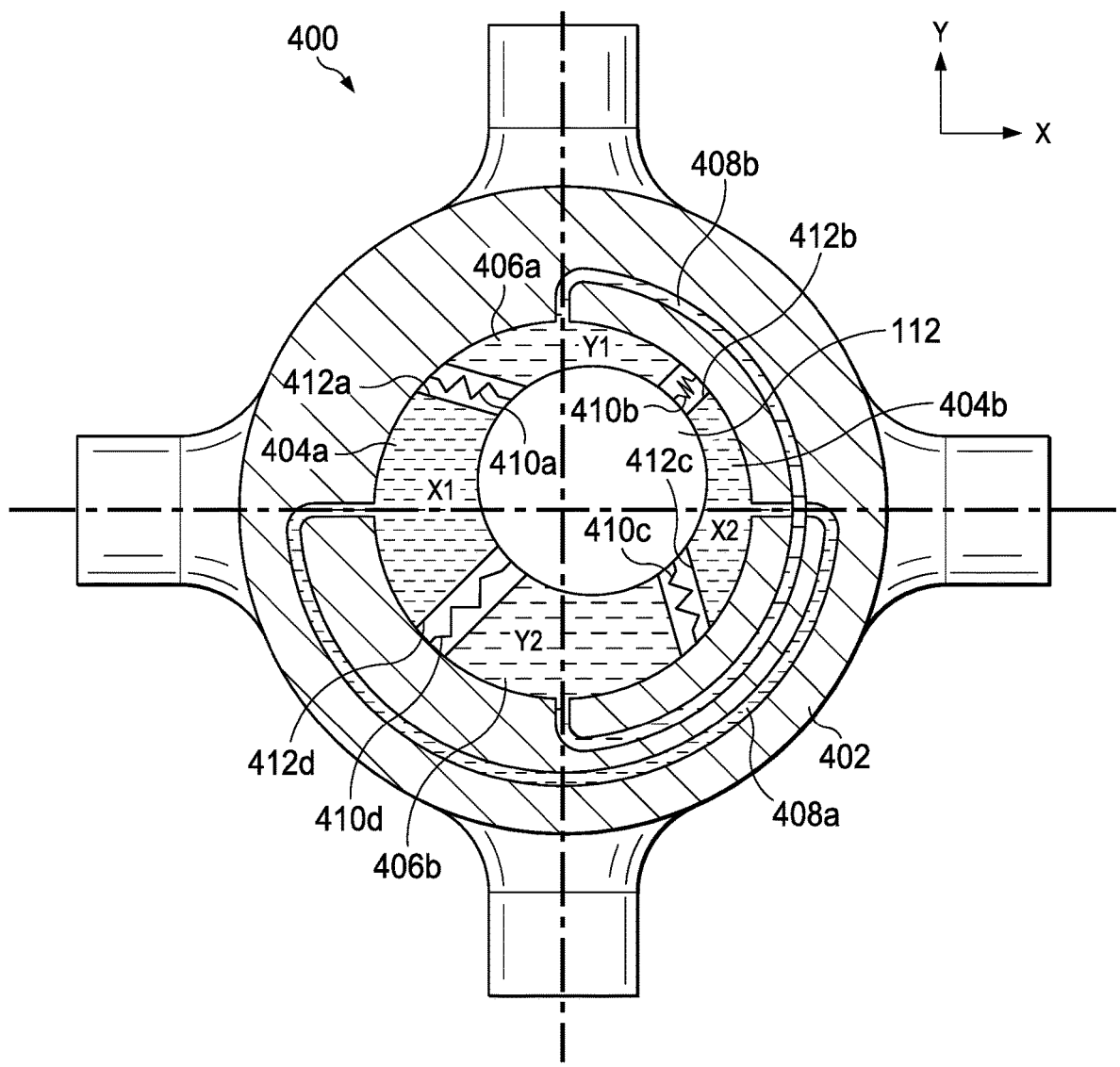

FIG. 4D illustrates the vibration isolation system 400, where the mast has moved away from both the X-axis and the Y-axis within the rotor hub 402. X-axis fluid chamber X1 404b and Y-axis chamber Y1 406a are smaller as a result of the motion of the mast 112, and X-axis and Y-axis fluid chambers X2 and Y2, 404a and 406b, respectively, are larger. The embodiment maintains fluid around the mast 112 by channeling from X-axis fluid chamber X1 404a to X-axis fluid chamber X2 404b through the X-axis inertia track 408a and from Y-axis fluid chamber Y1 406a to Y-axis fluid chamber Y2 406b through the Y-axis inertia track 408b. The vibration isolation system 400 is able to maintain fluid around the mast 112 without regard to the position of the mast 112 within the rotor hub 404, thus providing vibration isolation in two dimensions in the X-Y plane. FIG. 4D also shows springs 410a, 410b, 410c, 410d within compartments 412a, 412b, 412c, 412d, respectively.

Vibrations in the longitudinal-vertical plane at the pylon-fuselage interface result from oscillatory longitudinal hub shear forces, vertical hub shear forces, hub pitch moments, and hub roll moments. When the present invention is incorporated at the pylon-fuselage interface, vibrations in the longitudinal-vertical plane are effectively isolated.

FIGS. 5A, 5B, 5C, and 5D show embodiments of the present invention incorporated at the pylon-fuselage interface of a helicopter, with the pylon attachment in various positions within the fuselage attachment. In the embodiment shown, there are exemplary, non-limiting numbers of components: four fluid chambers, four elastic energy storage devices, and two fluid inertia tracks. One skilled in the art will recognize that there may be a variety numbers of fluid chambers, inertia tracks, and elastic energy storage devices in embodiments of the present invention, such as 2, 3, 4, 5, 6, 7, 8, or more fluid chambers; 1, 2, 3, 4, 5, 6, 7, 8, or more inertia tracks; and 2, 3, 4, 5, 6, 7, 8, or more elastic energy storage devices. The device of the present invention can be placed in between any two portions of the rotorcraft to prevent the transmission of vibrations (oscillatory loads) from one part to the other. On a tiltrotor, it could be between the rotor and the mast, between the mast support structure and the nacelle structure, between the nacelle and the wing, or between the wing and the fuselage. Generally, it is preferred to have the device close to the primary source of vibration (i.e., the rotor). The device of the present invention can also be placed between the engine and nacelle for isolation of vibration created by the engine. Generally, embodiments of the present invention may be used to from a first body, which may be a propeller hub, a rotor hub, a pylon attachment, or an engine, and a second body, which may be a propeller shaft, a rotor mast, or a body attachment (and body attachment may include a fuselage attachment, which includes the attachment of a wing to a fuselage and the attachment of a pylon to a fuselage, or a nacelle attachment, which includes an attachment of a nacelle to a wing).

Figure 5A:
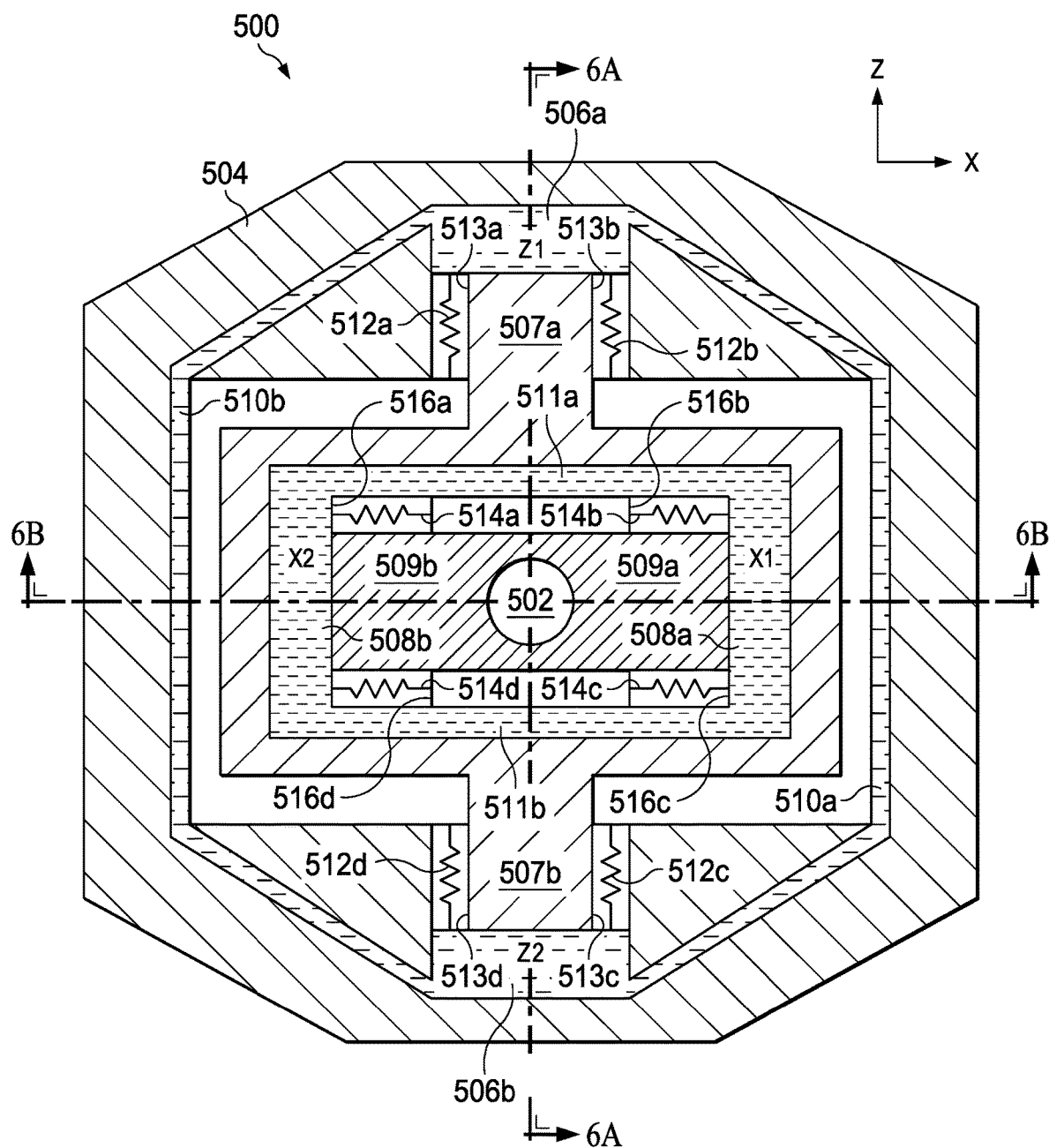
FIGS. 5A, 5B, 5C and 5D show cross-sectional views of an embodiment of the present invention applied to a pylon-fuselage interface.

FIG. 5A depicts a vibration isolation system 500 in which the pylon attachment 502 is in a neutral position, centrally located within the fuselage attachment 504. Here, the pylon attachment 502 is a non-limiting exemplary component. Further, the fuselage attachment is a non-limiting exemplary component. This embodiment and the present invention generally may be used with a first body that is, for example, propeller hub, a rotor hub, a pylon attachment, or an engine. This embodiment and the present invention generally may be used with a second body that is, for example, a propeller shaft, a rotor mast, or a body attachment (and body attachment may include a fuselage attachment or a nacelle attachment). With the pylon attachment in this neutral position, Z-axis fluid chambers Z1 506a and Z2 506b are of equal size and filled with equal amounts of fluid, and are coupled directly or indirectly to the pylon attachment 502 and the fuselage attachment 504. Z-axis pistons 507a, 507b force fluid from one Z-axis chamber 506a, 506b to the other as the pylon attachment moves parallel to the Z-axis. X-axis fluid chambers X1 508a and X2 508b are also of equal size and filled with equal amounts of fluid, and are coupled directly or indirectly to the pylon attachment 502 and the fuselage attachment 504. X-axis pistons 509a, 509b force fluid from one X-axis fluid chamber 508a, 508b to the other as the pylon attachment moves parallel to the X-axis. While the Z-axis fluid chambers 506a, 506b are in fluid communication through the Z-axis inertia tracks 510a, 510b, no fluid has been required to flow from one of the Z-axis fluid chambers 506a, 506b to the other or from one of the X-axis fluid chambers 508a, 508b to the other, which are in fluid communication through X-axis inertia tracks 511a, 511b. The pylon attachment 502 and the fuselage attachment 504 are also coupled by elastic energy storage devices, each one in a compartment that partitions the chambers from adjacent components. In FIGS. 5A, 5B, 5C, and 5D, these elastic energy storage devices are represented by non-limiting exemplary springs 512a, 512b, 512c, 512d within compartments 513a, 513b, 513c, 513d, respectively, for the Z-axis fluid chambers and springs 514a, 514b, 514c, 514d within compartments 516a, 516b, 516c, 516d, respectively, for the X-axis fluid chambers. One skilled in the art will recognize that these elastic energy storage devices may be other devices besides springs. These elastic energy storage devices stabilize the pylon attachment 502 within the fuselage attachment 504 and are disposed to further isolate vibrations and to return the pylon attachment 502 to a neutral position within the fuselage attachment 504 when displaced form a neutral position.

Figure 5B:
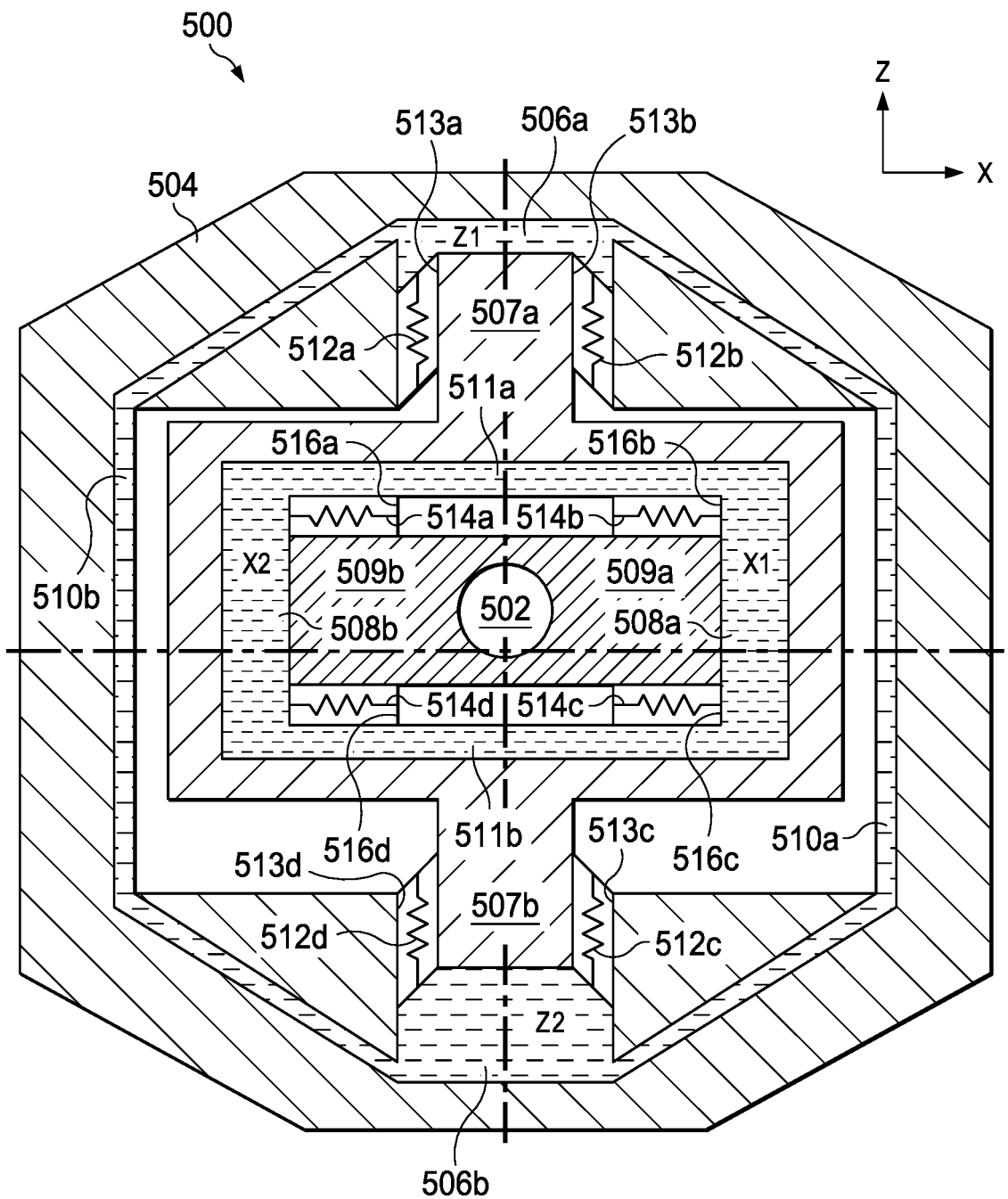

FIG. 5B illustrates the vibration isolation system 500 where the pylon attachment 502 has moved along the Z-axis within the fuselage attachment 504. While fluid has not moved from one X-axis fluid chamber 508a, 508b to the other, Z-axis fluid chamber Z1 506a is smaller as a result of the motion of the pylon attachment 502, and Z-axis fluid chamber Z2 506b is larger. The vibration isolation system 500 maintains fluid around the pylon attachment 502 by channeling fluid from z-axis fluid chamber Z1 506a to Z-axis fluid chamber Z2 506b through the Z-axis inertia tracks 510a, 510b. FIG. 5B also shows pistons 507a, 507b and 509a, 509b, springs 512a, 512b, 512c, 512d within compartments 513a, 513b, 513c, 513d, respectively, and springs 514a, 514b, 514c, 514d within compartments 516a, 516b, 516c, 516d, respectively.

Figure 5C:
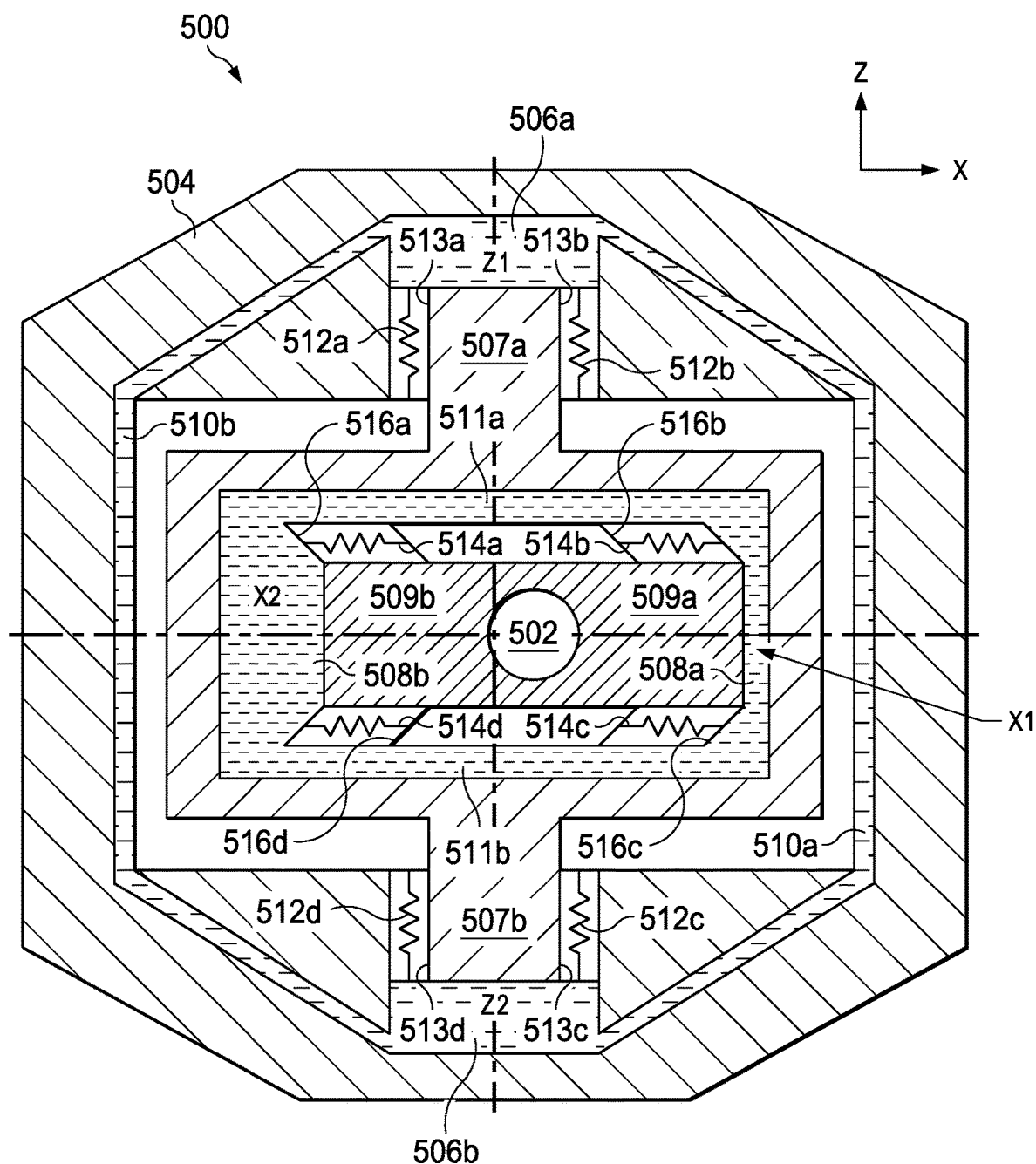

FIG. 5C illustrates the vibration isolation system 500 where the pylon attachment 502 has moved along the X-axis within the fuselage attachment 504. While fluid has not moved from one Z-axis fluid chamber 506a, 506b to the other, X-axis fluid chamber X1 508a is smaller as a result of the motion of the pylon attachment 502, and X-axis fluid chamber X2 508b is larger. The vibration isolation system 500 maintains fluid around the pylon attachment 502 by channeling fluid from X-axis fluid chamber X1 508a to X-axis fluid chamber X2 508b through the X-axis inertia tracks 511a, 511b. FIG. 5C also shows pistons 507a, 507b and 509a, 509b, springs 512a, 512b, 512c, 512d within compartments 513a, 513b, 513c, 513d, respectively, and springs 514a, 514b, 514c, 514d within compartments 516a, 516b, 516c, 516d, respectively.

Figure 5D:
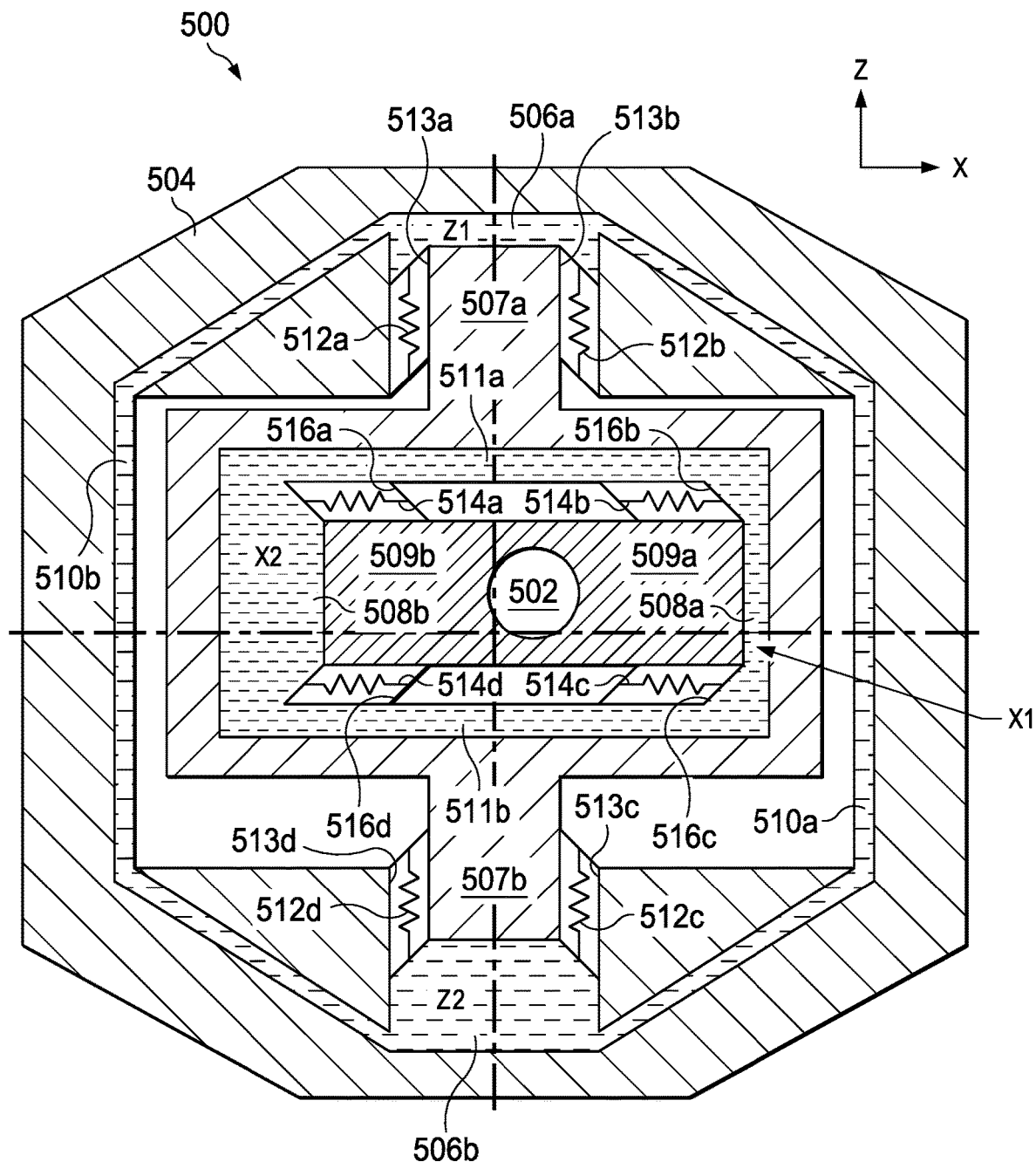

FIG. 5D illustrates the vibration isolation system 500 where the pylon attachment 502 has moved away from both the X-axis and the Z-axis within the fuselage attachment 504. Z-axis fluid chamber Z1 506a and Y-axis fluid chamber X1 508a are smaller as a result of the motion of the pylon attachment 502, and Z-axis and X-axis fluid chambers Z2 506b and X2 508b are larger. The vibration isolation system 500 maintains fluid around the pylon attachment 502 by channeling fluid from z-axis fluid chamber Z1 506a to Z-axis fluid chamber Z2 506b through the Z-axis inertia tracks 510a, 510b and from X-axis fluid chamber X1 508a to X-axis fluid chamber X2 508b through the X-axis inertia tracks 511a, 511b. The vibration isolation system 500 is thus able to maintain fluid around the pylon attachment 502 whatever the position of the pylon attachment 502 within the fuselage attachment 504, providing vibration isolation in the two dimensions of the X-Z plane. FIG. 5D also shows pistons 507a, 507b and 509a, 509b, springs 512a, 512b, 512c, 512d within compartments 513a, 513b, 513c, 513d, respectively, and springs 514a, 514b, 514c, 514d within compartments 516a, 516b, 516c, 516d, respectively.

Figure 6A:
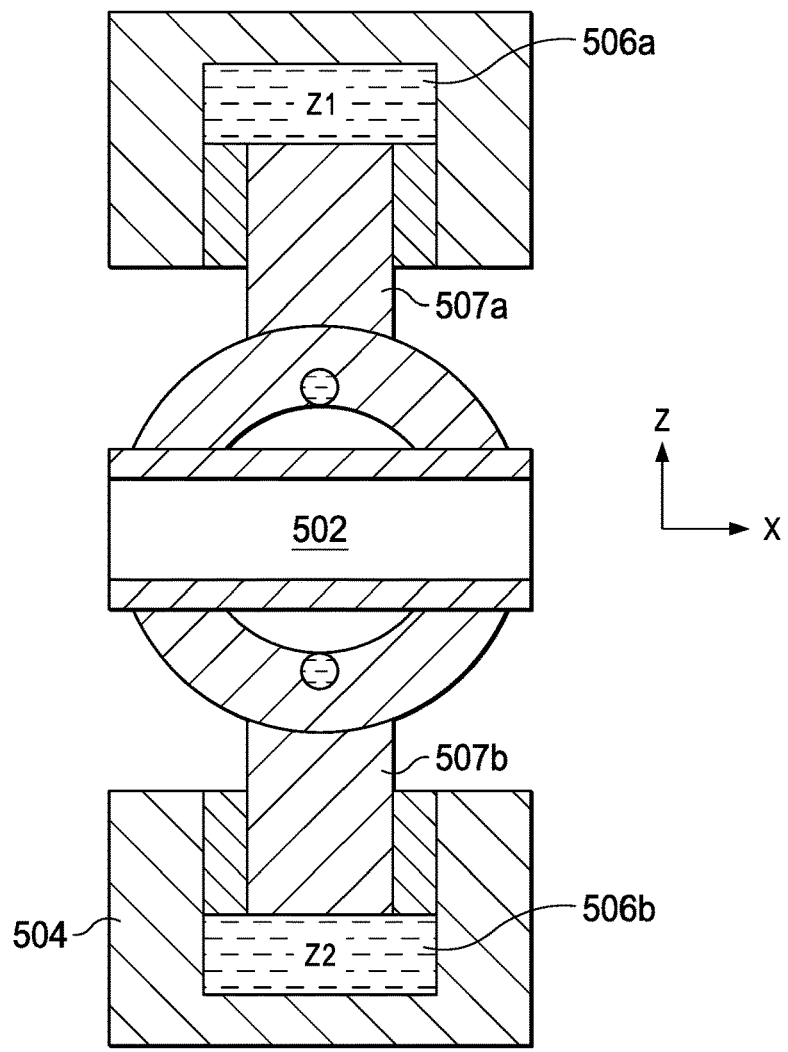
FIGS. 6A and 6B illustrate further cross-sectional views of an embodiment of the present invention applied to a pylon-fuselage interface.
Figure 6B:
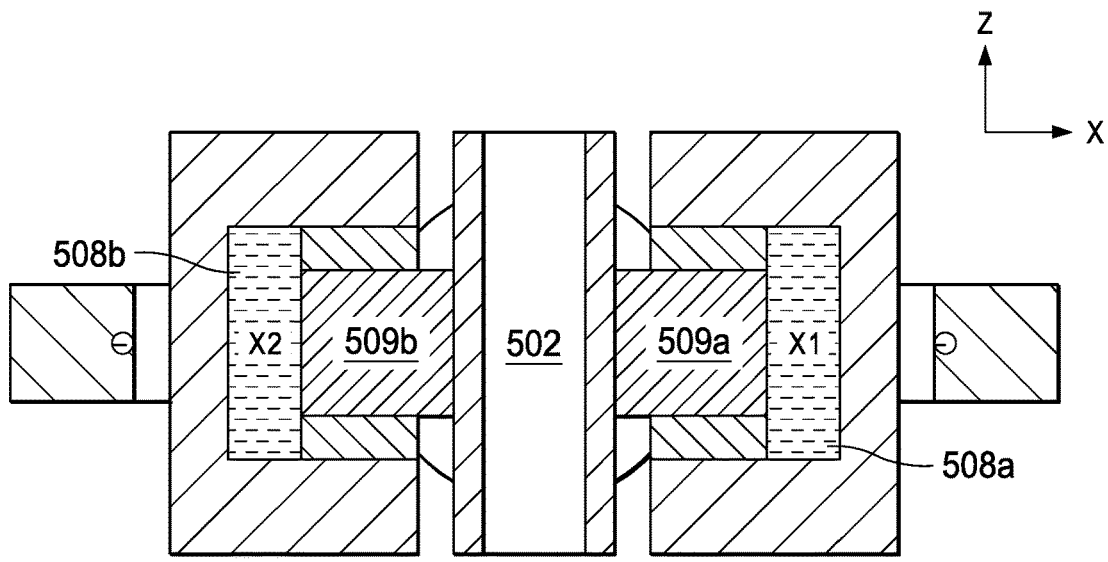

FIGS. 6A and 6B show cross-sections of the vibration isolation system 500 as depicted in FIG. 5A. FIG. 6A shows a cross-section in the Z-plane and depicts pylon attachment 502, fuselage attachment 504, Z-axis fluid chambers Z1 506a and Z2 506b, and pistons 507a, 507b. FIG. 6B shows a cross-section in the X-plane and depicts pylon attachment 502, X-axis fluid chambers X1 508a and Z2 508b, and pistons 509a, 509b.

Figure 7:
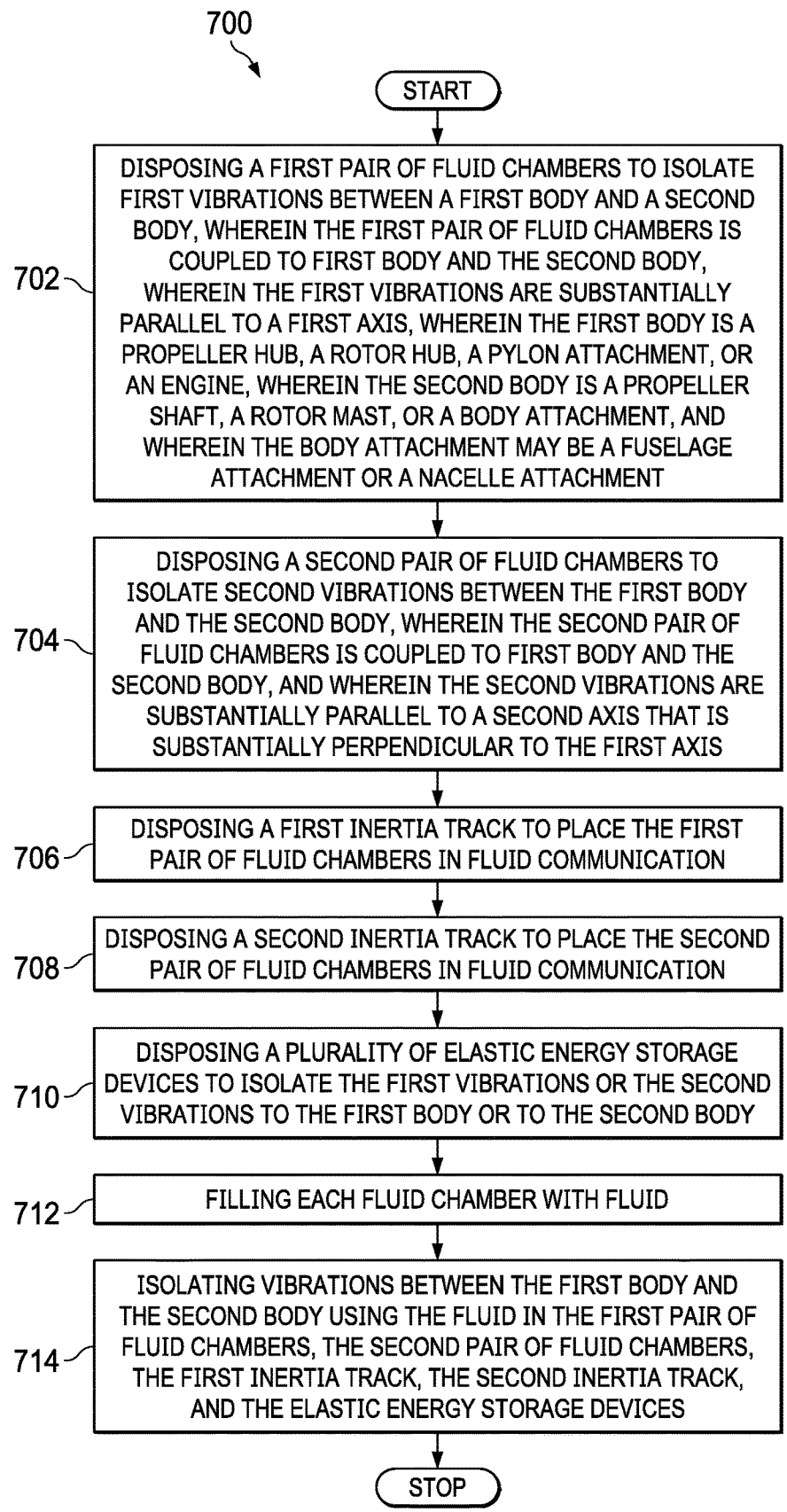
FIG. 7 shows a flowchart of a method embodiment of the present invention.

FIG. 7 shows a method 700 of isolating vibrations, illustrating an embodiment of the present invention. Method 700 includes block 702, which begins by disposing a first pair of fluid chambers to isolate first vibrations between a first body and a second body, wherein the first pair of fluid chambers is coupled to first body and the second body, wherein the first vibrations are substantially parallel to a first axis, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment. Next, the method includes block 704, that includes disposing a second pair of fluid chambers to isolate second vibrations between the first body and the second body, wherein the second pair of fluid chambers is coupled to first body and the second body, and wherein the second vibrations are substantially parallel to a second axis that is substantially perpendicular to the first axis. After block 704, the method includes block 706, that includes disposing a first inertia track to place the first pair of fluid chambers in fluid communication. The method continues with block 708, in which a second inertia track is disposed to place the second pair of fluid chambers in fluid communication. Next, the method includes block 710, where a plurality of elastic energy storage devices are disposed to isolate the first vibrations or the second vibrations to the first body or to the second body. Block 712 follows block 710 and includes filling each fluid chamber with fluid. Method 700 concludes with block 714, which includes isolating vibrations between the first body and the second body using the fluid in the first pair of fluid chambers, the second pair of fluid chambers, the first inertia track, the second inertia track, and the elastic energy storage devices.

Figure 8:
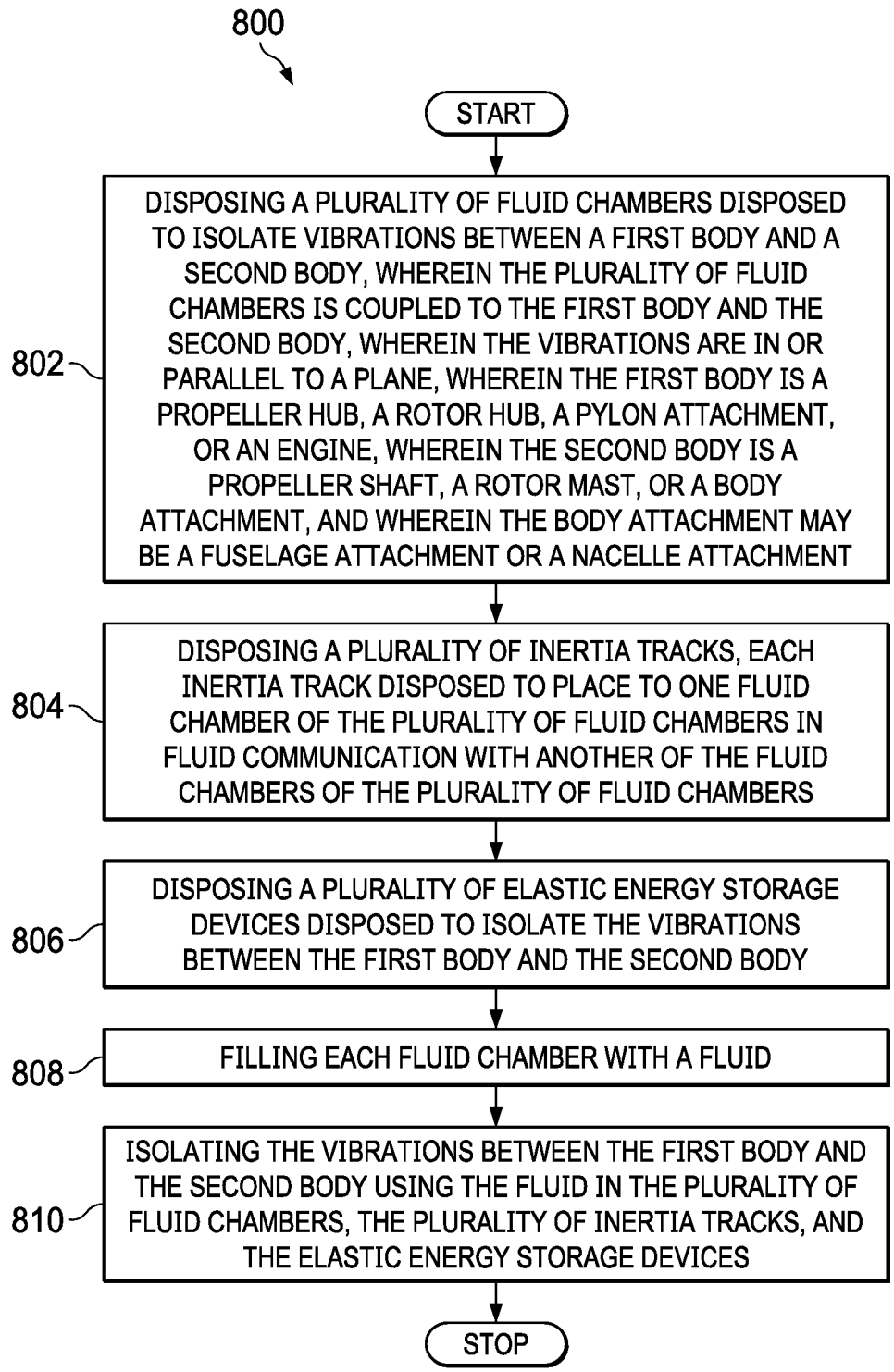
FIG. 8 shows a flowchart of another method embodiment of the present invention.

FIG. 8 shows a method 800 of isolating vibrations, illustrating another embodiment of the present invention. Method 800 begins with block 802, which begins by disposing a plurality of fluid chambers disposed to isolate vibrations between a first body and a second body, wherein the plurality of fluid chambers is coupled to the first body and the second body, wherein the vibrations are in or parallel to a plane, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment. The method continues with block 804, that includes disposing a plurality of inertia tracks, each inertia track disposed to place to one fluid chamber of the plurality of fluid chambers in fluid communication with another of the fluid chambers of the plurality of fluid chambers. Next, the method includes block 806, that includes disposing a plurality of elastic energy storage devices disposed to isolate the vibrations between the first body and the second body. After block 806, the method continues with block 808, in which each fluid chamber is filled with fluid. Method 800 concludes with block 810, where the vibrations between the first body and the second body are isolated using the fluid in the plurality of fluid chambers, the plurality of inertia tracks, and the elastic energy storage devices.

The skilled artisan will recognize that vibration isolation systems 400 and 500 and methods 700 and 800 are apparatuses and methods of isolation of vibrations caused by rotor systems which are relatively light in weight and more effective than typical prior art methods and apparatuses.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:
1. A vibration isolation system, comprising:
a first pair of fluid chambers disposed to isolate first vibrations between a first body and a second body, wherein the first pair of fluid chambers is coupled to the first body and the second body, wherein the first vibrations are substantially parallel to a first axis, wherein the first body is a propeller hub, a rotor hub, a pylon attachment, or an engine, wherein the second body is a propeller shaft, a rotor mast, or a body attachment; and wherein the body attachment may be a fuselage attachment or a nacelle attachment;
a second pair of fluid chambers disposed to isolate second vibrations between the first body and the second body, wherein the second pair of fluid chambers is coupled to the first body and the second body, and wherein the second vibrations are substantially parallel to a second axis that is substantially perpendicular to the first axis;
a first inertia track disposed to place the first pair of fluid chambers in fluid communication;
a second inertia track disposed to place the second pair of fluid chambers in fluid communication; and
a plurality of elastic energy storage devices coupled to the first body and the second body and disposed to isolate vibrations between the first body and the second body.
2. The system of claim 1, wherein the plurality of elastic energy storage devices comprises springs.

3. The system of claim 1, wherein adjacent fluid chambers are separated by a plurality of compartments, each compartment enclosing an elastic energy storage device.

4. The system of claim 1, wherein each of the fluid chambers of the first and second pairs of fluid chambers is filled with a non-compressible fluid, a non-viscous fluid, a non-freezable fluid, a fluid with a high density or specific gravity, a hydraulic fluid, oil, or some other fluid.

5. The system of claim 1, wherein the first pair of fluid chambers is disposed on opposite sides of the first body and the second pair of fluid chambers is disposed on opposite sides of the first body.

6. The system of claim 1, wherein the system isolates vibrations in a helicopter, a tiltrotor craft, or an airplane.

7. A vibration isolation system comprising:
a plurality of fluid chambers filled with a fluid and disposed to isolate vibrations between a first body and a second body, wherein the plurality of fluid chambers is coupled to the first body and the second body, wherein the vibrations occur in or parallel to a plane, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment;
a plurality of inertia tracks, each inertia track disposed to place one fluid chamber of the plurality of fluid chambers in fluid communication with another of the fluid chambers of the plurality of fluid chambers; and
a plurality of elastic energy storage devices coupled to the first body and the second body and disposed to isolate the vibrations between the first body and the second body.

8. The system of claim 7, wherein the plurality of elastic energy storage devices comprises springs.

9. The system of claim 7, further comprising a compartment enclosing each elastic energy storage device.

10. The system of claim 7, wherein each of the plurality of fluid chambers is filled with a non-compressible fluid, a non-viscous fluid, a non-freezable fluid, a fluid with a high density or specific gravity, a hydraulic fluid, oil, or some other fluid.

11. The system of claim 7, wherein the system isolates vibrations in a helicopter, a tiltrotor craft, or an airplane.

12. A method of isolating vibration in an aircraft, comprising:
disposing a first pair of fluid chambers to isolate first vibrations between a first body and a second body, wherein the first pair of fluid chambers is coupled to the first body and the second body, wherein the first vibrations are substantially parallel to a first axis, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment;
disposing a second pair of fluid chambers to isolate second vibrations between the first body and the second body, wherein the second pair of fluid chambers is coupled to the first body and the second body, and wherein the second vibrations are substantially parallel to a second axis that is substantially perpendicular to the first axis;
disposing a first inertia track to place the first pair of fluid chambers in fluid communication;
disposing a second inertia track to place the second pair of fluid chambers in fluid communication;
disposing a plurality of elastic energy storage devices to isolate the first vibrations or the second vibrations to the first body or to the second body;
filling each fluid chamber with fluid; and
isolating vibrations between the first body and the second body using the fluid in the first pair of fluid chambers, the second pair of fluid chambers, the first inertia track, the second inertia track, and the elastic energy storage devices.

13. The method of claim 12, wherein the plurality of elastic energy storage devices comprises springs.

14. The method of claim 12, wherein adjacent fluid chambers are separated by a plurality of compartments, each compartment enclosing an elastic energy storage device.

15. The method of claim 12, wherein each of the fluid chambers of the first and second pairs of fluid chambers is filled with, a non-compressible fluid, a non-viscous fluid, a non-freezable fluid, a fluid with a high density or specific gravity, a hydraulic fluid, oil, or some other fluid.

16. The method of claim 12, wherein the first pair of fluid chambers is disposed on opposite sides of the first body and the second pair of fluid chambers is disposed on opposite sides of the first body.

17. The method of claim 12, wherein the method isolates vibrations in a helicopter, a tiltrotor craft, or an airplane.

18. A method of isolating vibrations, comprising:
disposing a plurality of fluid chambers disposed to isolate vibrations between a first body and a second body, wherein the plurality of fluid chambers is coupled to the first body and the second body, wherein the vibrations are in or parallel to a plane, wherein the first body is a propeller hub, a rotor hub, a pylon attachment, or an engine, wherein the second body is a propeller shaft, a rotor mast, or a body attachment, and wherein the body attachment may be a fuselage attachment or a nacelle attachment;
disposing a plurality of inertia tracks, each inertia track disposed to place to one fluid chamber of the plurality of fluid chambers in fluid communication with another of the fluid chambers of the plurality of fluid chambers;
disposing a plurality of elastic energy storage devices disposed to isolate the vibrations between the first body and the second body;
filling each fluid chamber with a fluid; and
isolating the vibrations between the first body and the second body using the fluid in the plurality of fluid chambers, the plurality of inertia tracks, and the elastic energy storage devices.

19. The method of claim 18, wherein the plurality of elastic energy storage devices comprises springs.

20. The method of claim 18, wherein each elastic energy storage device is enclosed with a compartment.

21. The method of claim 14, wherein each of the plurality of fluid chambers is filled with, a non-compressible fluid, a non-viscous fluid, a non-freezable fluid, a fluid with a high density or specific gravity, a hydraulic fluid, oil, or some other fluid.

22. The method of claim 14, wherein the method isolates vibrations in a helicopter, a tiltrotor craft, or an airplane.

23. A rotorcraft, comprising:
a fuselage;
one or more engines coupled to the fuselage; and
a vibration isolation system coupled to the one or more engines comprising:
a first pair of fluid chambers, filled with a fluid and disposed to isolate first vibrations between a first body and a second body, wherein the first vibrations are substantially parallel to a first axis, wherein the first body is a propeller shaft, a rotor mast, a pylon attachment, or an engine, wherein the second body is a propeller hub, a rotor hub, or a body attachment, wherein the body attachment may be a fuselage attachment or a nacelle attachment, and wherein the first pair of fluid chambers is coupled to first body and the second body;

a second pair of fluid chambers, filled with the fluid, and disposed to isolate second vibrations between the first body and the second body, wherein the second vibrations are substantially parallel to a second axis that is substantially perpendicular to the first axis, and wherein the second pair of fluid chambers is coupled to first body and the second body;

a first inertia track disposed to place the first pair of fluid chambers in fluid communication;

a second inertia track disposed to place the second pair of fluid chambers in fluid communication; and a plurality of elastic energy storage devices coupled to first body and the second body and disposed to isolate the first vibrations or the second vibrations between the first body and the second body.

24. The rotorcraft of claim 23, wherein the plurality of elastic energy storage devices comprises springs.

25. The rotorcraft of claim 23, wherein adjacent fluid chambers are separated by a plurality of compartments, each compartment enclosing an elastic energy storage device.

26. The rotorcraft of claim 23, wherein each of the fluid chambers of the first and second pairs of fluid chambers is filled with a non-compressible fluid, a non-viscous fluid, a non- freezable fluid, a fluid with a high density or specific gravity, a hydraulic fluid, oil, or some other fluid.

27. The rotorcraft of claim 23, wherein the first pair of fluid chambers is disposed on opposite sides of the first body and the second pair of fluid chambers is disposed on opposite sides of the first body.

28. A rotorcraft, comprising:
a fuselage;
one or more engines coupled to the fuselage; and
a vibration isolation system coupled to the one or more engines comprising:
a plurality of fluid chambers filled with a fluid, and disposed to isolate vibrations between a first body and a second body, wherein the vibrations occur in or parallel to a plane, wherein the first body is a propeller shaft, a rotor mast, a pylon attachment, or an engine, wherein the second body is a propeller hub, a rotor hub, or a body attachment, wherein the body attachment may be a fuselage attachment or a nacelle attachment, and wherein the plurality of fluid chambers is coupled to the first body and the second body;
a plurality of inertia tracks, each inertia track disposed to place to one fluid chamber of the plurality of fluid chambers in fluid communication with another of the fluid chambers of the plurality of fluid chambers; and
a plurality of elastic energy storage devices coupled to the first body and the second body and disposed to isolate the vibrations between the first body and the second body.

29. The rotorcraft of claim 28, wherein the plurality of elastic energy storage devices comprises springs.

30. The rotorcraft of claim 28, further comprising a compartment enclosing each elastic energy storage device.

31. The rotorcraft of claim 28, wherein each of the plurality of fluid chambers is filled with a non-compressible fluid, a non-viscous fluid, a non-freezable fluid, a fluid with a high density or specific gravity, a hydraulic fluid, oil, or some other fluid.

* * * * *